March 14, 1961 T. REUMERMAN ET AL 2,974,865
CHECK SYMBOL COMPUTERS
Filed Dec. 18, 1957

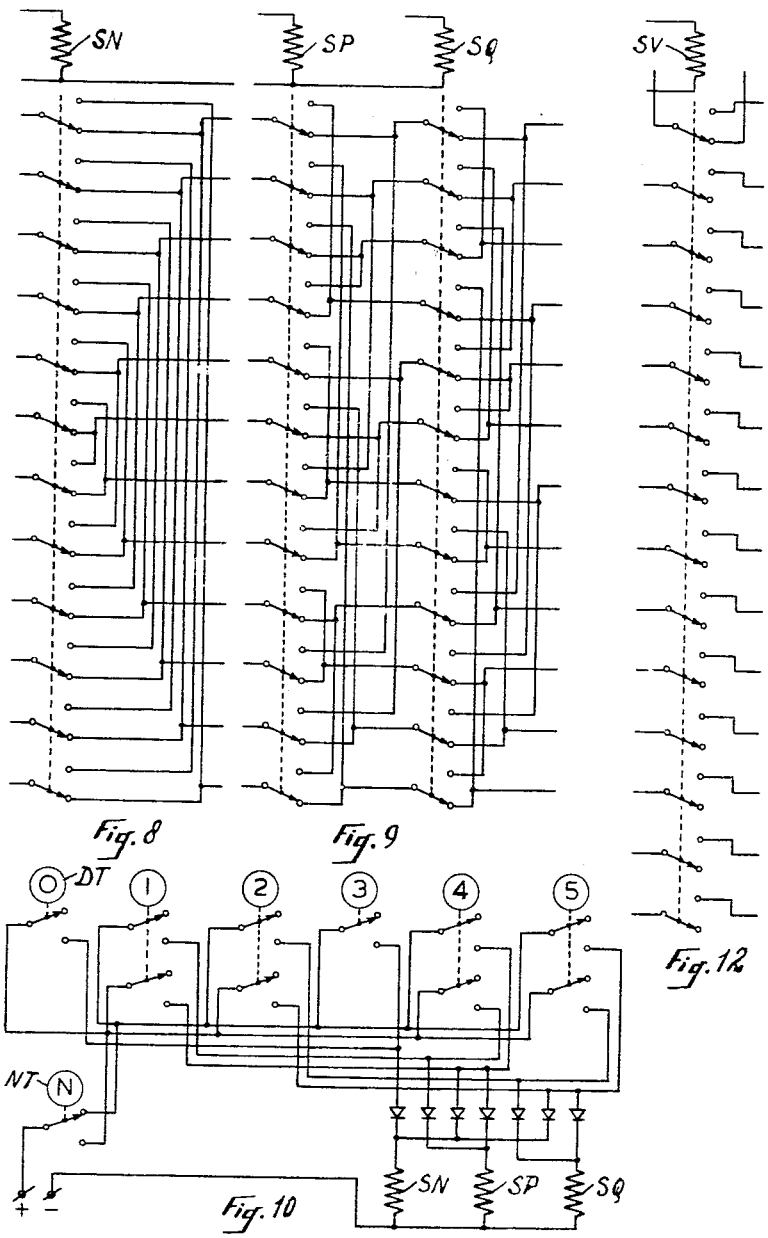

March 14, 1961  T. REUMERMAN ET AL  2,974,865
CHECK SYMBOL COMPUTERS
Filed Dec. 18, 1957  9 Sheets-Sheet 9

United States Patent Office 2,974,865
Patented Mar. 14, 1961

2,974,865

CHECK SYMBOL COMPUTERS

Theodorus Reumerman, 12 Zandvoortselaan, Zandvoort, Netherlands, and Willem H. T. Helmig, 9 Van Slingelandtlaan, Leiden, Netherlands Filed Dec. 18, 1957, Ser. No. 703,531

7 Claims. (Cl. 235—153)

The invention relates to a device for determining a check symbol for a number, and for checking a number already provided with a check symbol, and in particular to a device of this kind wherein the check symbol represents the remainder obtained on dividing the number by a fixed key value.

In general, the said key value is a prime number greater than 10. This choice of the key value is based on the fact that errors whereby one of the digits of a given number is altered, or whereby two adjacent digits of a given number are exchanged, have the effect of decreasing or increasing the given number by an amount which is indivisible by any prime number greater than 10. Thus, if such a prime number is used as a key value, a given number may be protected against the most common errors by determining the remainder on division of the number by the key value, and indicating this remainder by a suitable check symbol, for instance by a letter, which is appended to the number. The number may now be checked at any time by determining the remainder on division of the number by the key value, and comparing this remainder with the check symbol appended to the number.

This comparison may be automatically performed when the number is entered in an adding, calculating or accounting machine, whereby incorrect numbers may be prevented from being entered in the counters of such a machine. In general, it is desirable that the result of the calculation performed by the machine is again provided with a check symbol, so as to be certain that the result will be entered correctly in a subsequent process.

For this purpose, it has been proposed to provide each of the counters of an adding, calculating or accounting machine with an additional counting wheel, having a number of positions equal to the key value. For instance, if the key value is 13, the additional counting wheel has thirteen positions. Now, when a number is entered in the counter, a check value corresponding with the check symbol of the number is entered in the additional counting wheel. Thus, the check values are subjected to the same arithmetical operation as the numbers entered in the counter, so that the additional counting wheel indicates the check symbol of the result at the end of the operation.

This method has the disadvantage that all numbers to be entered in the machine must be provided with a check symbol beforehand, although it is not necessary in practice to check all these numbers. For instance, in accounting machines, the debit and credit entries are usually checked by crossfooting and similar procedures, whereas a check on the old balance is very difficult. Thus, it may be desirable to check the old balance with the aid of a check symbol without providing all the debit and credit entries with a check symbol.

The above-mentioned method, wherein each counter is provided with an additional counting wheel, is also impracticable in devices that do not comprise any counters. However, it may be desirable to know the check symbol of the result of a calculation without performing this calculation by means of counters.

It is an object of the invention to provide means for determining the check symbol of the result of an arithmetical operation without the use of additional counting wheels.

Another object of the invention is to provide a device for determining the check symbol of the result of an arithmetical operation, in which any of the numbers involved in this operation may be entered without a previously determined check symbol.

A further object of the invention is to provide means for checking whether a number is correctly indicated as positive or negative.

A still further object of the invention is to provide means for checking the position of the decimal point in decimal fractions.

According to a main feature of the invention, a device for determining a check symbol for a number, and for checking a number already provided with a check symbol, comprises means for transmitting check values corresponding with the check symbols of a plurality of numbers successively entered in the device to a calculating unit, computing from the transmitted check values the check symbol of the result of an arithmetical operation applied to the said numbers.

If the key value is equal to N, it is advantageous to use, as the check value $p$ of a number $Z$, the remainder obtained on division by N of the number $(N-10)Z$, or: $p=R_N(N-10)Z$, wherein $R_N$ is an operator denoting that the remainder on division of the argument by N should be taken. The advantage of this procedure is that, if the check value $p$ is placed behind the number $Z$, a new number $Z'=(10Z+p)$ is obtained which has the check value $p'=R_N(N.Z)=0$. Thus, a number received together with a check symbol may be checked by determining the check value $p'$ of the completed number $Z'$, and by verifying whether this check value is zero.

In practice, it is often advantageous to use letters as check symbols. The check value $p$ may take N different values; each of these values may be indicated by a letter, for instance, the value 1 by the letter A, the value 2 by the letter B, and so on. If these letters are indicated on the keys of a machine (together with the usual digits as far as possible, if desired), the check value of a number is entered in the machine when the corresponding check symbol is struck.

If two numbers $Z_1$ and $Z_2$ have the check values $p_1$ and $p_2$, respectively, the check value $p_s$ of the sum of these numbers is equal to $R_N(p_1+p_2)$. The check value $p_d$ of the difference $(Z_1-Z_2)$ is equal to $$R_N(p_1-p_2)=R_N(p_1+N-p_2)$$

Thus, the check symbol of the algebraic sum of a plurality of numbers may be determined by registering the value $p$ for the positive numbers and the value $(N-p)$ for the negative numbers, adding together the registered values, subtracting a multiple of N, if necessary, and representing the calculated check value by the corresponding check symbol.

The check value of the product of a plurality of numbers $Z_1, Z_2; \ldots Z_x$, of which the check values are equal to $p_1, p_2, \ldots p_x$, respectively, is equal to $$p_1 \cdot p_2 \cdots p_{x-1} \cdot p_x/(N-10)^{x-1}$$

Thus, the check symbol of such a product may be determined by registering for each number the value $$p/(N-10)$$

multiplying the registered values by each other, multiplying the product by $(N-10)$, subtracting a multiple of N, if necessary, and representing the calculated check value by the corresponding check symbol.

This may be explained by reference to a numerical example. If the key value is 13, the check value is $p=R_{13}(3Z)$. In this case, the check symbol of the algebraic sum of a plurality of numbers is found by registering the value $p$ for the positive numbers and the value $(13-p)$ for the negative numbers, adding together the registered values, subtracting a multiple of 13, if necessary, and representing the check value calculated in this manner by the corresponding check symbol. To find the check symbol of the product of a plurality of numbers, the value $p/3$ must be registered for each number. As $R_{13}(3.9)=R_{13}(27)=1$, a division of the check value by 3 is equivalent to a multiplication by 9. Thus, the value $R_{13}(9\ p)$ is registered for each number, the registered values are multiplied by each other, the product is multiplied by 3, a multiple of 13 is subtracted from the result, if necessary, and the check value found in this manner is represented by the corresponding check symbol.

The invention will be more fully explained by reference to the accompanying drawings, showing some embodiments of the invention. In these embodiments, the check value of a number is defined by the equation $p=R_{13}(3Z)$; however, the invention may also be used with other key values, such as 11, 17, 19 or 23, and with other equations for the check value.

Figs. 1 and 2, in combination, show the circuit diagram of the input unit of a device according to the invention, wherein numbers, either accompanied by a check symbol or not, may be entered by means of a key board. A number entered together with a check symbol is checked and the check value corresponding to the check symbol is transmitted to a calculating unit if the number is found to be correct. For a number entered without a check symbol, the check value is computed and transmitted to the calculating unit.

Figure 1:
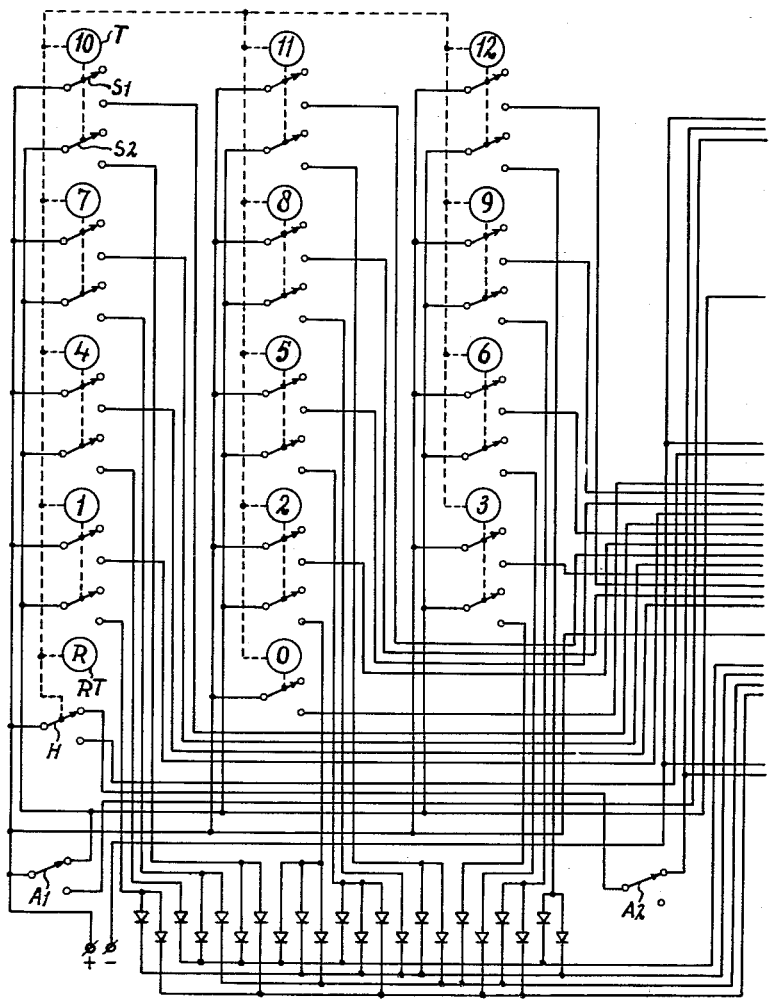
Figure 2:
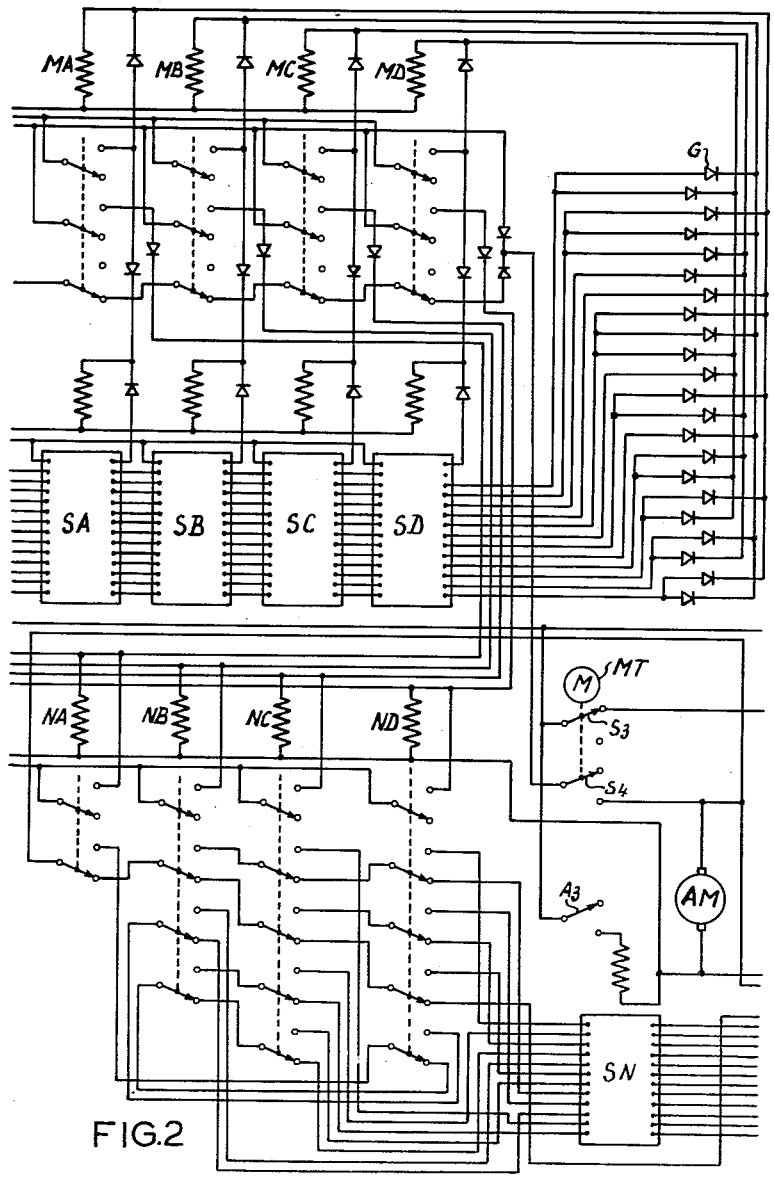
Figure 5:
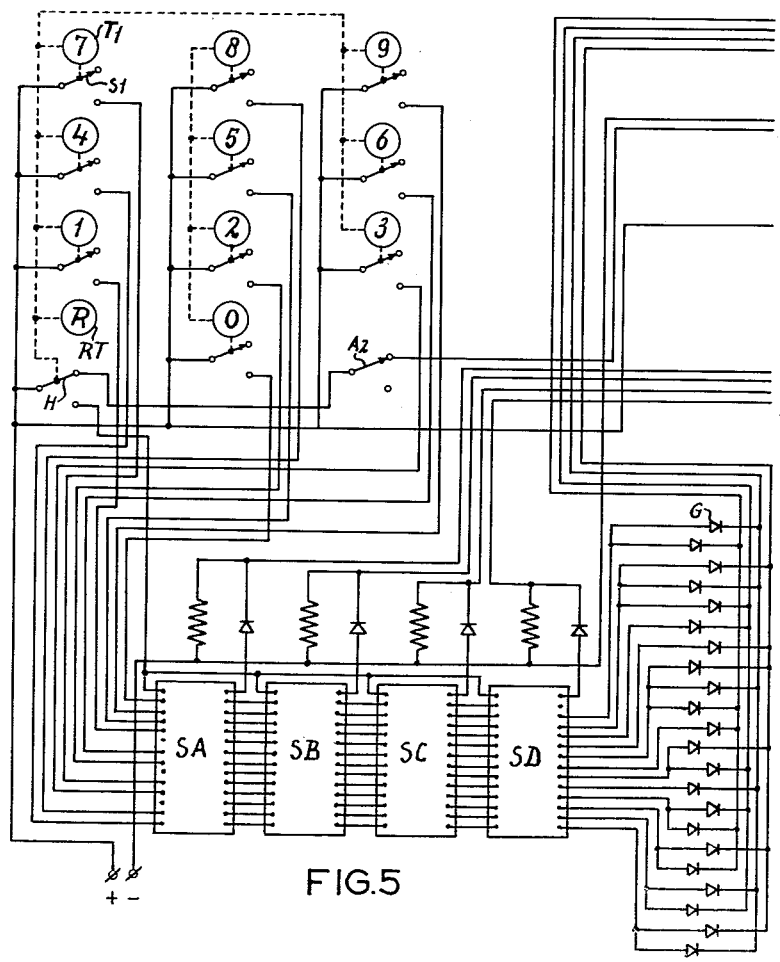
Figure 6:
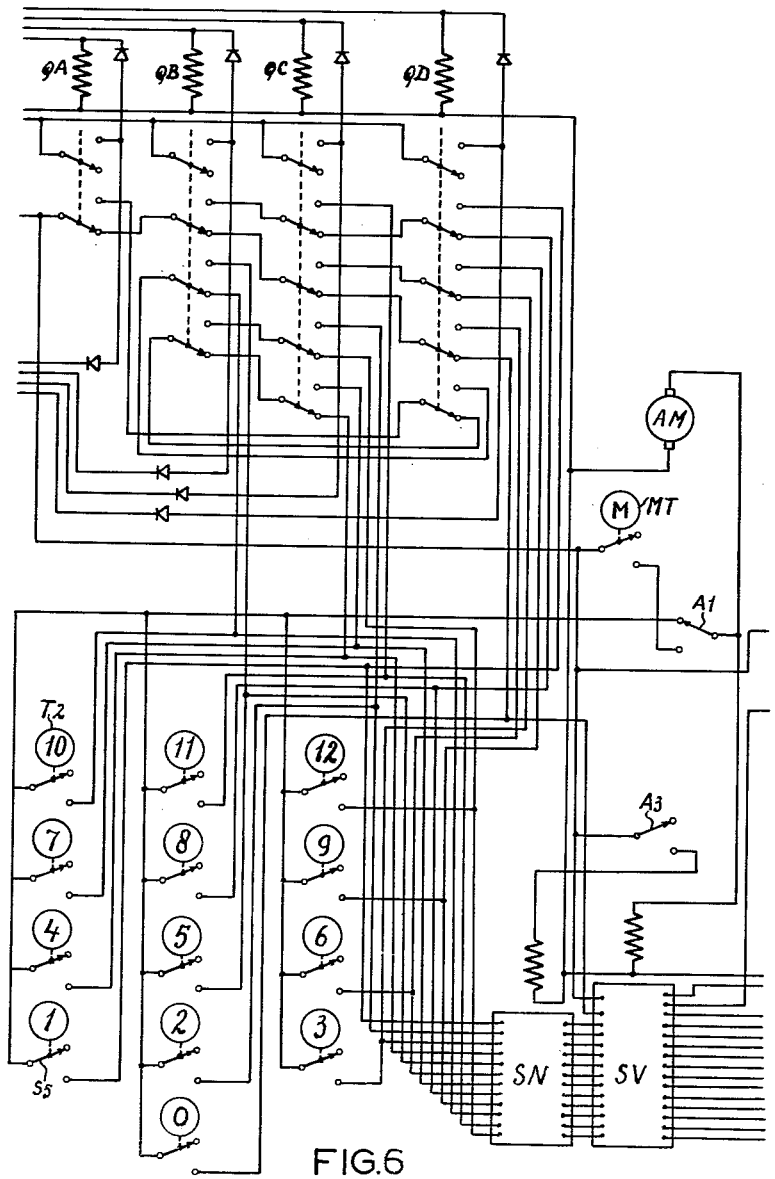

Figs. 5 and 6, in combination, show the circuit diagram of a modification of the input unit shown in Figs. 1 and 2, wherein a separate key group is provided for entering the check symbols.

Figure 3:
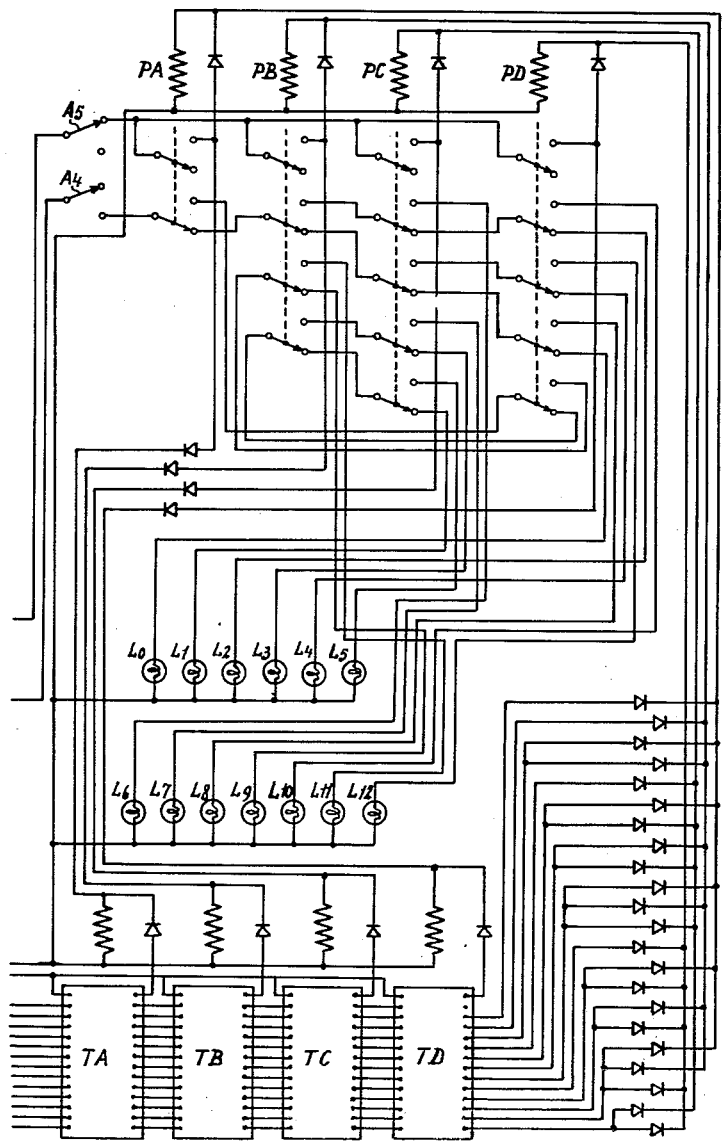
Fig. 3 shows the circuit diagram of a calculating unit adapted to be connected with the input unit shown in Figs. 1 and 2. This calculating unit computes the sum of the transmitted check values and determines the check symbol corresponding with this sum.
Figure 7:
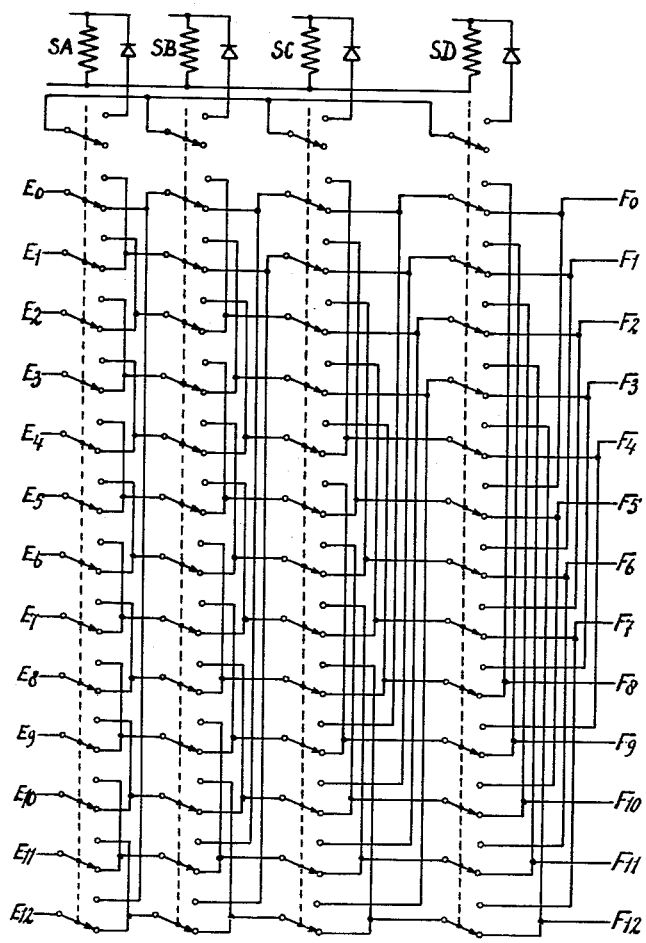

Fig. 7 shows a detailed circuit diagram of a switch unit appearing in Figs. 2, 3 and 5, and comprising four electro magnetic switches.

Fig. 8 shows a detailed circuit diagram of a switch appearing in Figs. 2 and 6, and serving to determine the sign of a check value to be transmitted.

Fig. 9 shows the circuit diagram of a combination of two switches which may be added to the switch shown in Fig. 8 in order to provide for a check on the position of the decimal point in decimal fractions.

Fig. 10 shows how the switches according to Figs. 8 and 9 may be controlled by means of keys.

Figure 4:
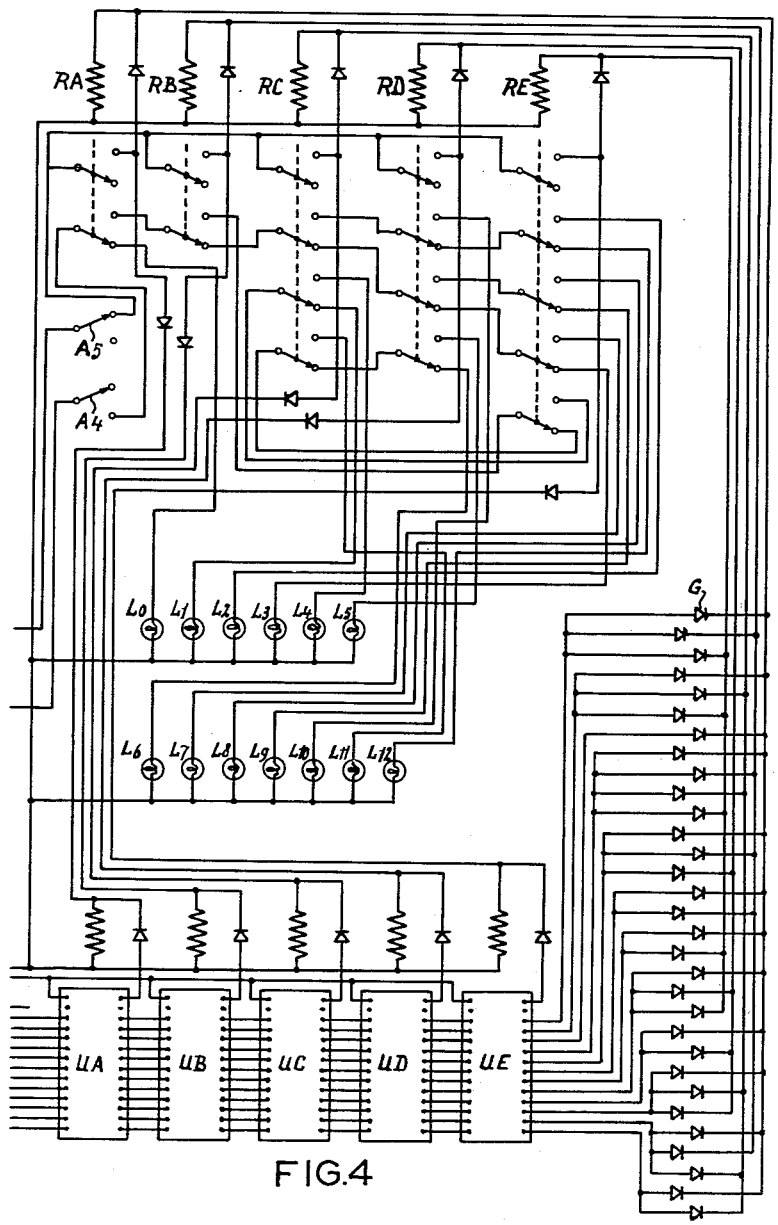
Fig. 4 shows the circuit diagram of a calculating unit which is likewise adapted to be connected with the input unit shown in Figs. 1 and 2. However, this calculating unit computes the product of the transmitted check values, and determines the check symbol corresponding with this product.
Figure 11:
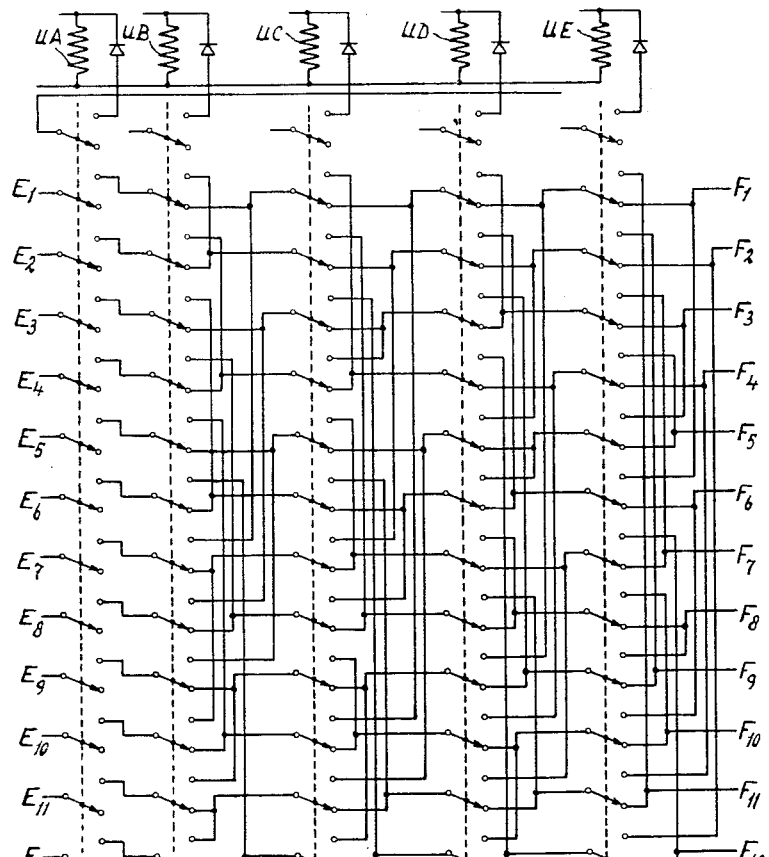

Fig. 11 shows a detailed circuit diagram of a switch unit appearing in Fig. 4, and comprising five electromagnetic switches.

Fig. 12 shows the circuit diagram of a transmitting switch appearing in Fig. 6.

Figure 13:
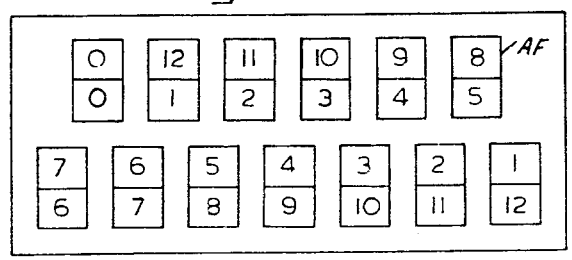

Fig. 13 shows a reading table for the check symbols that may be used in the calculating units shown in Figs. 3 and 4.

The input unit shown in Figs. 1 and 2 is provided with a key board (Fig. 1), having thirteen keys T marked with the numbers from 0 to 12, and a resetting key RT.

The keys marked with the numbers from 0 to 9 serve for striking the digits of a number to be entered, and for striking the check symbols corresponding with the check values from 0 to 9. The keys marked with the numbers 10, 11 and 12 only serve for striking the check symbols corresponding with the check values 10, 11 and 12. By means of the resetting key RT, the input unit may be returned to its zero position at any time, for instance if the operator perceives that he has struck an incorrect number.

Each of the keys marked with the numbers from 0 to 12 operates two switches $S_1$ and $S_2$, which occupy their zero position as shown if the associated key is not depressed, and which are brought into their working position when the associated key is struck. The key marked with the number 0 only operates a switch $S_1$.

Furthermore, each of the keys marked with the numbers from 0 to 12 operates an auxiliary switch H, as indicated in Fig. 1 by dotted lines. If none of the said keys is depressed, the switch H occupies its zero position as shown; as soon as any one of the keys is depressed, the switch H is brought into its working position. The resetting key RT only operates the switch H.

The input unit may take up numbers accompanied by a check symbol, which are checked in the input unit, as well as numbers without a check symbol, for which the check value is calculated in the input unit. The function switch $A_1$ (Fig. 1) determines which of the said two functions is performed by the input unit. If switch $A_1$ occupies its zero position as shown, the operation is such that the last symbol of each symbol group is considered as a check symbol, and that the number formed by the remaining symbols is checked with the aid of said check symbol. If the number is found to be correct, the check value corresponding with the check symbol is transmitted to the calculating unit. If switch $A_1$ is in its working position, a check value is determined for each symbol group, and this check value is transmitted to the calculating unit.

The check value of a number entered by means of the key board is determined by means of a switch unit shown in Fig. 2 and comprising four electromagnetic switches SA, SB, SL and SD. Each time a key is struck, the said switch unit computes a new check value $p_i$ from the entered digit $a_i$ and the previous check value $p_{i-1}$ according to the equation $p_i=R_{13}(10p_{i-1}+3a_i)$.

When the first digit is entered, the previous check value is zero, so that a new check value $p_1=R_{13}(a_1)$ is found. The second digit changes the check value to $$p_2=R_{13}(30a_1+3a_2)$$

the third digit changes the check value to $$p_3=R_{13}(300a_1+30a_2+3a_3)$$

and so on. For a number Z having $n$ digits, the check value $p_n$ found after entering the last digit is equal to $$p_n=R_{13}(3(10^{n-1}.a_1+10^{n-2}.a_2+\ldots+10a_{n-1}+a_n))=R_{13}(3Z)$$

If the check symbol corresponding with the check value $p_n$ is struck on the key board after the number Z, the switch unit SA—SD calculates a new check value $$p_{n+1}=R_{13}(10p_n+3p_n)=R_{13}(13p_n)$$

which is always equal to zero. Thus, if the number entered by means of the key board is correct, a check value zero is found after entering the check symbol. Hence, a number entered together with a check symbol may be checked by verifying whether the final check value $p_{n+1}$ is equal to zero.

The switch unit consisting of the switches SA, SB, SC and SD has been shown in detail in Fig. 7. As appears from the drawing, each switch has fourteen contacts, of which the upper one is a holding contact, while the other contacts connect the input terminals $E_0$–$E_{12}$ of the switch unit with the output terminals $F_0$–$F_{12}$ in an order determined by the positions of the switches. It will be easily seen that each input terminal $E_b$ is connected with the corresponding output terminal $F_b$ if all the switches occupy their zero position as shown. If one of the switches is brought into its working position, each input terminal $E_b$ is connected with such an output terminal $F_c$ that $c=R_{13}(b+1)$ if switch SA has been brought into its working position, $c=R_{13}(b+2)$ if switch SB has been brought into its working position, $c=R_{13}(b+4)$ if switch SC has been brought into its working position, and $c=R_{13}(b+8)$ if switch SD has been brought into its working position. For an arbitrary position of each of the four switches, the general equation is $c=R_{13}(b+d)$, wherein $d$ is a number determined by the positions of the switches. If the zero position of a switch is indicated by 0 and the working position by 1, the number of which the digits successively represent the positions of switches SD, SC, SB and SA indicates the value of the number $d$ in the binary system. For instance, if switches SA, SB and SC are in their working position, and switch SD is in its zero position, the positions of the switches are represented by the number 0 1 1 1, which indicates the value 7 in the binary system, so that $d=7$. Thus, in this case the equation is $c=R_{13}(b+7)$.

As shown in Fig. 2, the output terminals $F_1$–$F_{12}$ of the switch unit SA–SD are each connected, through rectifiers serving for decoupling the terminals, with a different combination out of the energizing coils of relays MA, MB, MC and MD. Thus, if a voltage appears on one of the output terminals $F_1$–$F_{12}$, one or more of the said relays are energized whereby a certain value $f$ is registered in the relay group MA–MD. If an energized relay is indicated by 1 and a de-energized relay by 0, the number formed by the digits representing successively the condition of relays MD, MC, MB and MA indicates the value of the number $f$ in the binary system. The connections between the output terminals $F_1$–$F_{12}$ and the relays MA–MD have been chosen in such manner that a voltage appearing on a certain output terminal $F_c$ brings about a condition of the relay group MA–MD for which $f=R_{13}(10c)$. For instance, the output terminal $F_5$ is connected with the energizing coils of relays MA, MB and MD, so that a voltage appearing on terminal $F_5$ brings the relay group MA–MD into the condition indicated by the number 1 0 1 1, representing the value 11 in the binary system. This is in accordance with the above equation, as $R_{13}(50)=11$.

Each of the relays MA, MB, MC and MD has three contacts. The upper contact of each relay serves as a holding contact and is connected with a line carrying a voltage when switch H occupies its zero position. In this position of switch H, the said upper contact of each relay provides an energizing circuit for the corresponding switch of the switch unit SA–SD. Thus, switch SA is energized by relay MA, switch SB by relay MB, switch SC by relay MC and switch SD by relay MD.

The middle contact of each of the relays MA–MD is connected with a line carrying a voltage when switch $A_1$ is in its working position; if any of the relays MA–MD is energized in this condition, the corresponding relay of the group NA–ND is also energized through said middle contact. Thus, relay MA energizes relay NA, relay MB energizes relay NB, and so on. The bottom contact of relay MA is connected with a line carrying a voltage if switch $A_1$ is in its zero position as shown, and serves together with the bottom contacts of relays MB, MC and MD for checking a number entered together with a check symbol.

The holding contacts of switches SA, SB, SC and SD are connected with a line carrying a voltage when switch H occupies its working position.

The switches $S_1$ of the keys marked with the numbers from 0 to 12 are each connected with one of the input terminals $E_0$–$E_{12}$ of the switch unit SA–SD, in such manner that, if the key marked with a certain number $a$ is struck, the associated switch $S_1$ supplies a positive voltage to the input terminal $E_b$ of switch unit SA–SD, for which $b=R_{13}(3a)$.

The switches $S_2$ of the keys marked with the numbers from 1 to 12 are connected with a line carrying a voltage if switch $A_1$ is in its zero position. If one of the said keys is depressed, a voltage is supplied, in this case, through one or more decoupling rectifiers G, to a certain combination out of the relays NA, NB, NC and ND, whereby a certain value $g$ is registered in these relays in the same manner as described hereinbefore for relay group MA–MD and switch unit SA–SD. The connections have been chosen in such manner that $g=R_{13}(10a)$, wherein $a$ is the number indicated on the depressed key.

Thus, it will be understood that relays NA–ND may be operated in two different manners. If function switch $A_1$ occupies its zero position as shown in the drawings, relays NA–ND are energized by means of the key operated switches $S_2$. If switch $A_1$ occupies its working position, relays NA–ND are energized by relays MA–MD. In the former case, the condition of relay group NA–ND is always determined by the value of the last symbol that has been struck on the keys; in the latter case, the condition of relay group NA–ND always corresponds with the condition of relay group MA–MD.

The upper contact of each of the relays NA–ND serves as a holding contact and is connected with a line carrying a voltage when switch H is in its zero position. The bottom contact of relay NA is connected with a switch $S_4$ operated by a key MT. If the relays NA–ND are all de-energized, switch $S_4$ is directly connected with the calculating unit through contacts of the said relays. If one or more of the relays NA–ND are energized, switch $S_4$ is connected with one of the input terminals of an electromagnetic switch SN. If the input terminals of switch SN are assumed to be numbered from top to bottom with the numbers from 1 to 12, the number $h$ of the input terminal connected with switch $S_4$ is equal to $R_{13}(4g)$, wherein $g$ is the value registered in relay group NA–ND. For instance, if relays NA and NC are energized, and relays NB and ND are de-energized, so that the condition of relay group NA–ND may be indicated by the number 0 1 0 1 representing the value 5 in the binary system, terminal 7 of switch SN is connected with switch $S_4$, since $R_{13}(4.5)=7$.

Switch SN has been separately shown in Fig. 8. As appears from the drawings, each input terminal $E_h$ of this switch is connected with the corresponding output terminal $F_h$ if the switch occupies its zero position as shown. If the magnet of switch SN is energized, so that the switch occupies its working position, each input terminal $E_h$ is connected with an output terminal $F_j$, for which $j=(13-h)$. The position of switch SN is determined by a function switch $A_3$. If this switch occupies its zero position as shown, switch SN is in its zero position. If a voltage is supplied, in this case, to the bottom contact of relay NA, this voltage appears on the output terminal $F_h$ of switch SN. If switch $A_3$ occupies its working position, switch SN is also in its working position, so that a voltage supplied through switch $S_4$ to the bottom contact of relay NA appears on the output terminal $F_j$ of switch SN for which $j=(13-h)$. In both cases, $h$ is equal to $R_{13}(4g)$, wherein $g$ is the value registered in relay group NA–ND.

The above-mentioned key MT operates two switches, to wit a switch $S_3$ and the above-mentioned switch $S_4$. Switch $S_3$ is directly connected with the positive terminal of the voltage source and supplies a voltage to the calculating unit if key MT has not been depressed, so that switches $S_3$ and $S_4$ are in their zero position as shown. If switch $A_1$ is in its working position, switch $S_4$ is also connected with the positive terminal of the voltage source, so that, upon depression of key MT, a voltage is supplied through switch $S_4$ to the calculating unit, to motor AM, and to the bottom contact of relay NA. If switch $A_1$ is in its zero position as shown, switch $S_4$ is connected with the positive terminal of the voltage source through series connected break contacts of relays MA, MB, MC and MD, so that, upon depression of key MT, there is only an effect if relays MA–MD are all de-energized.

By means of function switch $A_2$, shown in Fig. 1, the holding circuits of relays MA–MD and NA–ND may be interrupted.

The operation of the above-described input unit is as follows:

Before a number is entered by means of the key board, the switch unit SA–SD and the relay groups MA–MD and NA–ND must occupy their zero position, i.e. all switches of switch unit SA–SD must be in their zero positions, and all relays of relay groups MA–MD and NA–ND must be de-energized.

When the first digit $a_1$ is struck, a voltage is supplied through the switch $S_1$ associated with the key in question to the input terminal of switch unit SA–SD having the number $R_{13}(3a_1)$. As all switches of switch unit SA–SD are in their zero positions, the voltage appears on the output terminal having the number $p_1 = R_{13}(3a_1)$. As a consequence, one or more relays of the relay group MA–MD are energized, in such a combination that the value $R_{13}(10p_1)$ is registered in this relay group. The auxiliary switch H, which was brought into its working position upon depression of the key bearing the number $a_1$, returns to its zero position as soon this key is released and completes the holding circuits of relays MA–MD, so that the relays of this group that have been energized, are held when the key is released. At the same time, a voltage is supplied through the holding contacts of the relays that have been energized to the associated magnets of switches SA–SD, so that the value $R_{13}(10p_1)$ is registered in the switch unit SA–SD.

When the second digit $a_2$ is struck, a voltage is supplied to the input terminal of switch unit SA–SD having the number $R_{13}(3a_2)$. As the value $R_{13}(10p_1)$ has been registered in this switch unit, the said voltage appears on the output terminal of the switch unit bearing the number $p_2 = R_{13}(10p_1 + 3a_2)$. Upon depression of the key bearing the number $a_2$, switch H is changed over, whereby the holding circuits of relays MA–MD are interrupted, and all relays of this group are de-energized, unless they are again energized through the switch unit. The magnets of the switches of switch unit SA–SD that are in their working positions are held through switch H. The voltage appearing on the output terminal $p_2$ of the switch unit SA–SD energizes one or more relays of the group MA–MD, in such a combination that the value $R_{13}(10p_2)$ is registered in this relay group. Upon release of key $a_2$, switch H is returned to its zero position, whereby the holding circuits of switches SA–SD are interrupted, and these switches return to their zero positions, unless they are again energized by one of the relays MA–MD. At the same time, the holding circuits of relays MA–MD are switched on, so that the relays of this group that have been energized are held, and the switches associated with these relays are held or brought into their working positions. The value $R_{13}(10p_2)$ has now been registered in relay group MA–MD, as well as in switch unit SA–SD.

Thus, it will be understood that, upon depression of a key, the switch unit SA–SD computes a new check value $p_i$ from the previous check value $p_{i-1}$ and the value $a_i$ of the symbol that has been struck on the key board, according to the equation $p_i = R_{13}(10p_i + 3a_i)$.

If switch $A_1$ is in its zero position upon depression of a certain key, bearing the number $a$, one or more relays of group NA–ND are energized through the switch $S_2$ associated with said key, in such a combination that the value $R_{13}(10a)$ is registered in said relay group. At the same time, the holding circuits of relays NA–ND are interrupted, so that these relays are de-energized unless they are again energized through said switch $S_2$. Thus, after a number and the associated check symbol have been struck on the key board, the value $R_{13}(10p_n)$ is registered in the relay group NA–ND, wherein $p_n$ is the check value corresponding with the check symbol that has been struck. If the number is correct, relay group MA–MD is in its zero position, in which all relays of the group are de-energized. Upon depression of key MT, a voltage is supplied through the series connected bottom contacts of relays MA–MD and through switch $S_4$ to the bottom contact of relay NA, and to motor AM. As the value $R_{13}(10p_n)$ has been registered in relay group NA–ND, the said voltage appears on the input terminal of switch SN having the number $$R_{13}(4.10p_n) = p_n$$

unless all relays of group NA–ND are de-energized; in this latter case, the said voltage is directly supplied to the calculating unit.

If the function switch $A_1$ is in its working position, the value $R_{13}(10p_n)$ is registered in relay group MA–MD when the last digit $a_n$ of the number has been struck. As explained hereinbefore, the condition of relay group NA–ND corresponds in this case with the condition of relay group MA–MD, so that the value $R_{13}(10p_n)$ is also registered in relay group NA–ND. Thus, when key MT is struck, motor AM is switched on, and a voltage is supplied to the input terminal of switch SN having the number $p_n$, unless $p_n = 0$; in this latter case, the said voltage is directly supplied to the calculation unit.

Thus, if function switch $A_3$ is in its zero position as shown, output terminal $p_n$ of switch SN is excited when key MT is struck. If switch $A_3$ is in its working position, a voltage appears on the output terminal of switch SN having the number $(13 - p_n)$. If $p_n$ is equal to zero, a voltage is directly supplied to the calculating unit in both cases. Thus, except for the case that a number entered together with its check symbol is incorrect, the value $p_n$ or $(13 - p_n)$ is always supplied to the calculating unit upon depression of key MT.

Switch $A_3$ occupies its zero position as shown when the number entered by means of the key board is positive, and is brought into its working position when a negative number is entered. Thus, the value $p_n$ is transmitted to the calculating unit for positive numbers, and the value $(13 - p_n)$ for negative numbers.

Motor AM is the motor of an adding, calculating or accounting machine to which the device according to the invention has been added. When the motor is switched on, the number that has been struck on the key board is entered in known manner into one or more counters of the machine. If the device according to the invention is not associated with a machine of the above-mentioned kind, the motor AM may be replaced, for instance, by a glow lamp giving a light signal when a checked number is correct.

If the motor does not run, or the glow lamp is not lighted, this means that the number that has been entered is incorrect. The device may now be returned to its zero position by means of key RT, so that the number may be entered once again. Upon depression of the key RT, the holding circuits of relays MA–MD and NA–ND are interrupted, but no voltage is supplied to switch unit SA–SD, so that the said relays are de-energized and switches SA–SD are returned to their zero positions.

After transmission of the check value of a number to the calculating unit, the input unit must be returned to its zero position, so that the next number may be entered. It is possible to use key RT for this purpose, but it is preferred in most cases to make use of function switch $A_2$, which is also adapted to interrupt the holding circuits of relays MA–MD and NA–ND.

The calculation unit shown in Fig. 3 comprises a switch unit consisting of four electromagnetic switches TA, TB, TC and TD, a relay group consisting of four relays PA, PB, PC and PD, two function switches $A_4$ and $A_5$, and a series of thirteen glow lamps $L_0$–$L_{12}$ for reading the computed check symbol.

Switch unit TA–TD is exactly equal to switch unit SA–SD; the holding contacts of switches TA–TD are connected with a line leading to switch $S_4$. Relay group PA–PD is substantially equal to relay group NA–ND; however, the holding contacts of relays PA–PD are not only connected with the energizing coils of the relays in question, but also with the energizing coils of the associated switches of switch unit TA–TD. Furthermore, the holding contacts of relays PA–PD are connected with a line leading to switch $S_3$.

As shown in Fig. 7, the output terminals of switch TD are each connected through one or more decoupling rectifiers with a certain combination out of the energizing coils of relays PA–PD. The connections have been chosen in such manner that a value $k$ is registered in relay group PA–PD when a voltage appears on output terminal $F_k$ of switch TD. The bottom contact of relay PA will then be connected with glow lamp $L_k$.

Before the first check value is transmitted to the calculating unit, the same must be in its zero position, i.e. switches TA–TD must occupy their zero positions, and relays PA–PD must be de-energized. When the first check value $w_1$ is transmitted to the calculating unit, a voltage appears on the output terminal having the number $w_1$ of switch unit TA–TD, whereby the value $w_1$ is registered in relay group PA–PD. Upon release of key MT, the said voltage disappears, but the holding circuits of relays PA–PD are closed at the same time, so that the relays of group PA–PD that have been energized are held. Furthermore, the associated switches of switch unit TA–TD are brought into their working positions, whereby the value $w_1$ is registered in the switch unit.

When key MT is again depressed in order to transmit a second check value $w_2$ to the calculating unit, the holding circuits of relays PA–PD are interrupted, and the holding circuits of switches TA–TD are closed, so that switches TA–TD are held, and relays PA–PD are de-energized, unless they are again energized through switch unit TA–TD. As the value $w_1$ has been registered in switch unit TA–TD, a voltage appears on the output terminal of this switch unit having the number $R_{13}(w_1+w_2)$, so that this value is registered in relay group PA–PD. Upon release of key MT, the holding circuits of relays PA–PD are closed and the holding circuits of switches TA–TD are interrupted, whereby the value $R_{13}(w_1+w_2)$ is also registered in switch unit TA–TD.

When a plurality of check values $w$ have been transmitted to the calculating unit in this manner, the final value registered in relay group PA–PD is $R_{13}(\Sigma w)$. If function switch $A_4$ is changed over, this value may be read on the corresponding glow lamp. It will be clear that the symbol read on this glow lamp is the check symbol of the algebraic sum of the numbers entered by means of the key board.

By changing over function switch $A_5$, the holding circuits of relays PA–PD may now be interrupted, whereby the calculating unit is returned to its zero position.

The device according to Figs. 1, 2 and 3 is particularly suitable for checking the old balance in an accounting machine. In such a machine, the old balance is entered in a certain position of the carriage, and transmitted to one or more counters by striking a motor key. After that, the carriage is displaced to a new position, in which a debit or credit entry is made. This entry is struck on the key board and transmitted to the counters by striking the motor key, after which the carriage moves to its final position, and the new balance is automatically printed. The debit and credit entries may be checked by means of crossfooting and similar procedures. However, there is generally no check on the old balance.

By means of the device according to the invention, the old balance may be automatically checked, if the check symbol of each new balance is recorded and entered together with this balance at the next entry.

In this case, the function switches $A_1$–$A_5$ are operated by the carriage of the accounting machine in the following manner. When the old balance is entered, switch $A_1$ is in its zero position, so that the old balance, which is entered together with a check symbol, is checked by the input unit, and transmitted to the counters only if it is found to be correct.

During the movement of the carriage to its second position, switch $A_2$ is temporarily changed over, whereby the input unit is reset to its zero position. At the same time switch $A_1$ is brought into its working position, so that the debit or credit entry may be made without a check symbol. If the carriage is brought into its debit position, switch $A_3$ is changed over, so that the check value of the debit entry is transmitted to the calculating unit with a negative sign. In the credit position, switch $A_3$ remains in its zero position.

In the final position of the carriage, switch $A_4$ is closed, so that the check symbol of the new balance may be read. During the return movement of the carriage, switches $A_2$ and $A_5$ are temporarily changed over, whereby the input unit and the calculating unit are reset to their zero positions.

The operation of the device may be further explained by reference to a numerical example. It will be assumed that the old balance is $37.25. The check value of 3725 is $R_{13}(3\times3725)=8$, so that the old balance is accompanied by the check symbol representing the check value 8. If the new entry is $17.45, for which the check value is $R_{13}(3\times1745)=9$, the value 9 is transmitted to the calculating unit in the case of a credit entry, and the value 4 in the case of a debit entry. In the first case, the new balance of $54.70 is accompanied by the check symbol corresponding with the value $R_{13}(8+9)=4$; in the second case, the new balance of $19.80 is accompanied by the check symbol corresponding with the value 12.

There is still a small difficulty if the new balance is negative. For instance, if the old balance is $17.45 and a debit entry of $37.25 is made, the new balance of minus $19.80 is accompanied by the check symbol representing the check value $R_{13}(9+5)=1$, and the balance of $19.80 cannot be checked by means of the device shown in Figs. 1, 2 and 3 with the aid of this check symbol. In order to remove this disadvantage, the reading table for the check symbols may be constructed as shown in Fig. 13.

The reading table shown in Fig. 13 comprises thirteen reading windows AF, each arranged above one of the glow lamps $L_0$–$L_{12}$. Each of the reading windows bears two symbols, of which the bottom one corresponds with the number $k$ of the glow lamp in question, and the upper one with the value $(13-k)$. The bottom symbol must now be read for a positive, and the upper symbol for a negative balance.

In practice, it will often be desirable that the check symbol of the new balance is automatically printed together with the balance. For this purpose, each of the glow lamps $L_0$–$L_{12}$ may be replaced by a printing magnet serving to print the check symbol in question. In accounting machines, a negative balance is always printed in a special manner, for instance in a different color or together with a special symbol. The device which brings about this special manner of printing may also be used to change over the printing magnets in such manner that the appropriate check symbol is printed for a negative balance.

If the device according to Figs. 1, 2 and 3 is not associated with an accounting machine, the function switches may, of course, be operated by means of keys.

In describing the operation of the circuit according to Figs. 1, 2 and 3, it has been assumed that the first number is checked, and that no check is made on the succeeding numbers. If one of the numbers succeeding the first number must be automatically checked with the aid of a check symbol, the circuit as described has still the disadvantage that the calculating circuit is brought back to its zero position upon depression of key MT if an incorrect number has been entered, so that the whole calculation must be started anew in this case. This disadvantage may be removed by disengaging switch $S_3$ from key MT, and by operating this switch by means of a separate relay connected in parallel with motor AM. In this case, the holding circuits of relays PA–PD are only interrupted when a check value is transmitted to the calculating unit, so that no interruption of the holding circuits occurs when an incorrect number has been entered; thus, only the incorrect number needs be entered again.

The above-described device may also be used for determining the check symbol of the result of a multiplication, when it is used in combination with a machine which performs a multiplication by repeated addition. For machines performing a direct multiplication, it will be necessary to use a calculating unit which determines the check symbol of the product of a plurality of numbers directly. Such a calculating unit has been shown in Fig. 4.

The calculating according to Fig. 4 differs from the unit shown in Fig. 3 in that a switch unit with five electromagnetic switches UA, UB, UC, UD and UE, and a relay group with five relays RA, RB, RC, RD and RE are used.

The switch unit UA–UE is separately shown in Fig. 11. As appears from the drawings, none of the input terminals is connected with an output terminal when all switches are in their zero positions. If switch UA is brought into its working position, each input terminal $E_b$ is connected with the corresponding output terminal $F_b$. If, in addition to switch UA, one of the other switches is brought into its working position, each input terminal $E_b$ is connected with an output terminal $F_c$ in such manner that $c=R_{13}(2b)$ if switch UB is brought into its working position, $c=R_{13}(4b)$ if switch UC is brought into its working position, $c=R_{13}(3b)$ if switch UD is brought into its working position, and $c=R_{13}(11b)$ if switch UE is brought into its working position. For arbitrary positions of switches UB–UE, with switch UA in its working position, the general equation is $$c=R_{13}(q.b)$$

wherein $q$ is a factor determined by the positions of the switches. One may say that the value $q$ is registered in the switch unit UA–UE in this case. In the same way, it is possible to indicate, for each condition of relay group RA–RE, a value $s$ said to be registered in this relay group in the said condition. The following table shows, which switches are in their working positions, or which relays are energized respectively, when a certain value ($q$, or $s$, respectively) is registered in the switch unit or the relay group.

| $q, s$ | switches | relays |
|---|---|---|
| 0 | | |
| 1 | UA | RA |
| 2 | UA, UB | RA, RB |
| 3 | UA, UD | RA, RD |
| 4 | UA, UC | RA, RC |
| 5 | UA, UC, UE | RA, RC, RE |
| 6 | UA, UB, UD | RA, RB, RD |
| 7 | UA, UD, UE | RA, RD, RE |
| 8 | UA, UB, UC | RA, RB, RC |
| 9 | UA, UB, UE | RA, RB, RE |
| 10 | UA, UB, UC, UE | RA, RB, RC, RE |
| 11 | UA, UE | RA, RE |
| 12 | UA, UC, UD | RA, RC, RD |

The output terminals $F_1$–$F_{12}$ of switch unit UA–UE are connected through decoupling rectifiers with the energizing coils of relays RA–RE in such manner that a value $R_{13}(9c)$ is registered in said relay group when a voltage appears on output terminal $F_c$.

The connections between the contacts of relays RA–RE and the glow lamps $L_0$–$L_{12}$ have been chosen in such manner that the lamp with the number $R_{13}(3s)$ is ignited by a voltage supplied to the bottom contact of relay RA when a value $s$ is registered in the relay group RA–RE.

The operation of the calculating unit according to Fig. 4 is as follows:

When the first check value $w_1$ is transmitted to the calculating unit, the value $R_{13}(9w_1)$ is registered in the relay group RA–RE. After release of key MT, this value is also registered in the switch unit UA–UE. When the second check value $w_2$ is transmitted to the calculating unit, a voltage appears on the output terminal $R_{13}(9w_1.w_2)$, so that the value $$R_{13}(81.w_1.w_2)=R_{13}(3w_1.w_2)$$

is registered in relay group RA–RE. If function switch $A_4$ is changed over after that a voltage is supplied to the glow lamp having the number $R_{13}(9w_1.w_2)$, so that the check symbol corresponding with this number is read. This is indeed the check symbol pertaining to the product of the numbers that have been entered.

This may be further explained by reference to a numerical example. It will be assumed that the numbers 25 and 37 are successively entered. The check value of 25 is $R_{13}(3\times25)=10$, and the check value of 37 is $R_{13}(3\times37)=7$. After the first number has been entered, the value 10 is transmitted to the calculating unit, so that the value $R_{13}(9\times10)=12$ is registered in relay group RA–RE. After the second number has been entered, the value 7 is transmitted to the calculating unit, so that a voltage appears on the output terminal of switch unit UA–UE having the number $R_{13}(12\times7)=6$, and a value $R_{13}(9\times6)=2$ is registered in relay group RA–RE. If switch $A_4$ is changed over after that, a voltage is supplied to the glow lamp having the number $R_{13}(3\times2)=6$, so that the check symbol corresponding with the check value 6 is read. The check value of the product $$25\times37=925 \text{ is indeed } R_{13}(3\times925)=6.$$

If desired, the calculating units shown in Figs. 3 and 4 may be connected to the input unit shown in Figs. 1 and 2 through a commutator switch, so that they may be switched on alternately. Thus, a device is obtained, by means of which all arithmetical operations may be checked.

Figs. 5 and 6 show an input unit which may be used instead of the unit shown in Figs. 1 and 2 in combination with the calculating units shown in Figs. 3 and 4.

In the input unit according to Figs. 5 and 6, the key board comprises a group of ten keys $T_1$ for entering the digits of a number, and a second group of thirteen keys $T_2$ serving for entering the check symbols. The keys $T_1$ are shown in Fig. 5, the keys $T_2$ in Fig. 6. The resetting key RT, the motor key MT and the switches $A_1$, $A_2$ and $A_3$ have the same functions as in the input unit according to Figs. 1 and 2.

Each of the keys $T_1$ operates only one switch $S_1$, having the same function as in Fig. 1. Each of the keys $T_2$ operates one switch $S_5$.

Switches $S_1$ are connected, in the same manner as in Figs. 1 and 2 with the input terminals of a switch unit SA–SD, which is identical to the switch unit SA–SD in Fig. 2. The output terminals of this switch unit are connected through decoupling rectifiers with the energizing coils of four relays QA–QD, the connections being exactly the same as between the output terminals of switch unit SA–SD and relays MA–MD in Fig. 2. Relay group QA–QD is substantially equal to relay group PA–PD in Fig. 3; however, the holding contact of each of the relays QA–QD is connected with switch H, and the bottom contact of relay QA is permanently connected with the positive terminal of the voltage source.

It will be understood that, after a number has been entered by means of keys $T_1$, the value $R_{13}(10p_n)$ is registered in relay group QA–QD, $p_n$ being the check value of the number.

If the number need not be checked, key MT is struck after that. As function switch $A_1$ is in its working position, motor AM is switched on, and the magnet of transmitting switch SV is energized at the same time. According to the position of switch SN, which has the same function as in Fig. 2, a voltage appears on the input terminal having the number $p_n$ or $(13-p_n)$ of the transmitting switch SV, so that this value is transmitted to the calculating unit.

If the number entered by means of the key board is to be checked, the check symbol is struck on key group $T_2$. If the number is correct, motor AM is switched on, and the magnet of transmitting switch SV is energized through switch $A_1$, which is in its zero position, so that the value $p_n$ or $(13-p_n)$ is transmitted to the calculating unit. If the number is incorrect, nothing happens; the input unit may now be reset to its zero position by means of key RT, after which the number may be entered anew.

The transmitting switch SV is separately shown in Fig. 12. As appears from the drawings, the upper contact of this switch feeds the holding circuits of relays PA–PD, or RA–RE respectively, in the zero position, and the holding circuits of switches TA–TD, or UA–UE respectively, in the working position. Thus, the holding circuits of the said relays are only interrupted when a check value is transmitted to the calculating unit, so that, after entering an incorrect number, it is sufficient to enter only this number anew.

Instead of immediately before the transmitting switch SV, the switch SN may also be arranged in series with the switch unit SA–SD, for instance between the switches $S_1$ and the input terminals of the switch unit, or between the output terminals of the switch unit and the rectifiers connecting the switch unit with relays QA–QD. In this case, the value $R_{13}(10(13-p_n))$ is registered in relay group QA–QD instead of the value $R_{13}(10p_n)$ if switch SN is in its working position. If the number is to be checked, the check symbol corresponding with the check value $(13-p_n)$ must be struck on the keys $T_2$ in this case. If the device is associated with an accounting machine, a negative balance must now be accompanied by the check symbol corresponding with the number of the glow lamp of the series $L_0$–$L_{12}$ which has been ignited. Thus, instead of the reading table shown in Fig. 13, a reading table will have to be used which comprises only one symbol on each reading window. If the check symbol is automatically printed together with the new balance, no change over of the printing magnets is required for negative balances. It will be understood that this entails the advantage that the sign of the balance is included in the checking procedure.

If desired, it is possible to enlarge the scope of the checking procedure still further by including the position of the decimal point. For this purpose, the switches SP and SQ shown in Fig. 10 may be arranged in series with switch SN. Apart from the fact that switches SP and SQ have no holding contacts, switch SP is equal to switch UC in Fig. 4, and switch SQ to switch UD in Fig. 4.

If the check value of a certain number is known, the check value of a number which is ten times smaller may be found by multiplying the known check value by 4, and subtracting a multiple of 13, if necessary. For instance, the check value of $10^6$ is equal to 3, the check value of $10^5$ is equal to 12, the check value of $10^4$ is equal to 9, the check value of $10^3$ is equal to 10, the check value of $10^2$ is equal to 1, the check value of 10 is equal to 4, and the check value of 1 is equal to 3. It follows logically that the check value of 0.1 will be equal to 12, the check value of 0.01 equal to 9, the check value of 0.001 equal to 10, and so on. Thus, if the check value of a decimal fraction has been determined as though the number did not contain any decimal point, and has been found to be $p_n$, the correct check value, taking the position of the decimal fraction into account, will be $p_n'=R_{13}(4^m \cdot p_n)$, wherein $m$ is the number of digits behind the decimal point. If the decimal fraction is negative, the correct check value is $(13-p_n')$. Thus, if the number of digits behind the decimal point is 0, 1, 2, 3, 4 or 5, respectively, the value $p_n$ must be multiplied by 1, 4, 3, 12, 9 or 10 respectively for positive numbers, and by 12, 9, 10, 1, 4 or 3 respectively for negative numbers in order to find the correct check value. Of course, a multiple of 13 must be subtracted from the product, if necessary. The required multiplication is performed by the switches SN, SP and SQ. The following table shows which switches must be in the working position for this purpose in the various cases.

| number of digits behind dec. point | positive numbers | negative numbers |
|---|---|---|
| 0 | | SN |
| 1 | SP | SN, SP |
| 2 | SQ | SN, SQ |
| 3 | SN | |
| 4 | SN, SP | SP |
| 5 | SN, SQ | SQ |

Fig. 10 shows how switches SN, SP and SQ may be brought into the above-mentioned positions. Use is made for this purpose of a key NT which is struck when a negative number is entered and which is held in its depressed position until it is released for the entry of a positive number, and of six decimal keys DT, marked with the numbers 0, 1, 2, 3, 4 and 5 respectively, denoting the number of digits behind the decimal point. The keys DT are constructed in such manner that a depressed key is held in the depressed position until one of the other keys DT is struck. Each of decimal keys 1, 2, 4 and 5 operates two switches, of which the upper one is connected with a line carrying a voltage when key NT is not depressed and the bottom one is connected with a line carrying a voltage when key NT is depressed. Decimal key 0 operates only one switch connected with the last-mentioned line, and decimal key 3 only operates one switch connected with the first-mentioned line. The said switches are connected through decoupling rectifiers with the magnets of switches SN, SP and SQ in such manner that the switches indicated in the above table are brought into their working positions in each case.

The above-described circuit which includes the position of the decimal point in the checking procedure is of particular importance for calculating machines adapted to perform all kinds of arithmetical operations. The result of the calculation is then provided with a check symbol which allows for a complete check on the result in a next operation.

Although the invention has been described hereinbefore by reference to some specific embodiments thereof, it is to be understood that the invention is not limited to these embodiments, and that various modifications thereof are possible within the scope of the invention as set forth in the appended claims. In particular, each of the switches SA–SD, TA–TD, UA–UE, SN, SP, SQ and SV may be replaced, if desired, by a set of relays each having a limited number of contacts, for instance five contacts at most, and having their energizing coils connected in parallel.

We claim:

1. In combination, an input unit comprising common symbol entering means for the digits of a number and for a check symbol that may accompany a number, a switch unit connected with said symbol entering means, consisting of a plurality of switches and adapted to compute from the value $a_i$ of a symbol entered through said symbol entering means a new check value $$p_i = R_N(10 p_{i-1} + t \cdot a_i)$$

wherein $t$ is a constant factor, $p_{i-1}$ is the check value previously computed by said switch unit, N is a fixed key value, and $R_N$ is an operator denoting that the remainder on division by N should be taken, a main register registering the new check value $p_i$ and supplying the same to said switch unit before the next symbol is entered, an auxiliary register, switching means providing for two alternate modes of operation of said auxiliary register, such that the value registered in said auxiliary register is equal to the value registered in said main register for one position of said switching means, and that the value of the last symbol that has been entered is registered in said auxiliary register for the other position of said switching means, a calculating unit comprising means for computing from the check values of a plurality of numbers of the check value of the result of an arithmetical operation applied to the said numbers, means for transmitting the value registered in said auxiliary register to said calculating unit, and means operative in said last-mentioned position of said switching means for preventing the transmission of the value registered in said auxiliary register if the value registered in said main register is unequal to zero.

2. The combination as claimed in claim 1, wherein said main register comprises a plurality of relays, and said auxiliary register comprises a second plurality of relays each associated with one of the relays of said main register, the relays of the auxiliary register being energized each through a make contact of the associated relay of said main register for said first-mentioned position of said switching means, and through said symbol entering means for said last-mentioned position of said switching means, and wherein the said transmitting means comprise an electromagnetic switch directly energized by the operating voltage in the first-mentioned position of said switching means, and energized through series connected break contacts of the relays of said main register in the last-mentioned position of said switching means.

3. In combination, an input unit comprising a first set of entering means for the digits of a number, a first set of switches each controlled by one of the said first set of entering means, a second set of entering means for check symbols, a second set of switches each controlled by one of said second set of entering means, a switch unit having a plurality of input terminals each connected to one of the switches of said first set, consisting of a plurality of electromagnetic switches and adapted to compute from the value $a_i$ of a digit entered by said first set of entering means a new check value $$p_i = R_N(10 p_{i-1} + t \cdot a_i)$$

wherein $t$ is a constant factor, $p_{i-1}$ is the check value previously computed by said switch unit, N is a fixed key value, and $R_N$ is an operator denoting that the remainder on division by N should be taken, a register registering the new check value $p_i$ and supplying the same to said switch unit before the next digit is entered, a calculating unit comprising means for computing from the check values of a plurality of numbers the check value of the result of an arithmetical operation applied to the said numbers, an N-polar electromagnetic transmitting switch for transmitting the value in said register to said calculating unit, having N input terminals each connected with one of the output terminals of said register and with one of the switches of said second set, a transmitting key, a switch controlled by said transmitting key, and switching means whereby said electromagnetic transmitting switch may be energized either through the switch controlled by said transmitting key, or through one of the switches of said second set.

4. In combination, an input unit comprising means for computing from the digits of a number a check value dependent on the remainder obtained on dividing the number by a fixed key value, and for checking a number accompanied by such a check value, a calculating unit comprising means for computing from the check values of a plurality of numbers the check value of the result of an arithmetical operation applied to the said numbers, means for transmitting the check values of numbers successively entered in said input unit to said calculating unit and means for multiplying the check values transmitted to said calculating unit by any desired power of 10 in order to include the position of the decimal point of the number in question in the checking procedure.

5. In combination, an input unit comprising means for computing from the digits of a number a check value equal to $R_N(t \cdot Z)$, wherein Z is the absolute value of the number, $t$ a constant factor, N a fixed key value, and $R_N$ an operator denoting that the remainder on division by N should be taken, and for checking a number accompanied by such a check value; a calculating unit comprising a switch unit consisting of a plurality of electromagnetic switches each including a holding contact and N computing contacts, and adapted to compute from each entered value $w_i$ a new check value $$k_i = R_N(k_{i-1} + w_i)$$

wherein $k_{i-1}$ is the check value previously computed by said switch unit, energizing and holding circuits operatively associated with said electromagnetic switches, and a register registering the new check value $k_i$ and supplying the same to said switch unit before the next value $w_{i+1}$ is entered, comprising a plurality of relays each operatively associated with one of the said electromagnetic switches and each including a make contact, a holding contact and a plurality of contacts to indicate the position of the register, holding circuits operatively associated with the holding contacts, each of the said electromagnetic switches being energized through the make contact of the associated relay; and means for transmitting to said calculating unit the value $R_N(t \cdot Z)$ for each positive number entered into said input unit, and the value $N - R_N(t \cdot Z)$ for each negative number entered into said input unit, including a switch member interrupting the holding circuits of the said relays and the energizing circuits of the said electromagnetic switches and closing the holding circuits of the said electromagnetic switches during each transmission.

6. In combination, an input unit comprising means for computing from the digits of a number a check value equal to $R_N(t \cdot Z)$, wherein Z is the value of the number, $t$ a constant factor, N a fixed key value, and $R_N$ an operator denoting that the remainder on division by N should be taken, and for checking a number accompanied by such a check value; a calculating unit comprising a switch unit comprising a plurality of electromagnetic switches each including a holding contact and $(N-1)$ computing contacts, and adapted to compute from each entered value $w_i$ a new check value $k_i = R_N(k_{i-1} \cdot w_i / t)$, wherein $k_{i-1}$ is the check value previously computed by said switch unit, energizing and holding circuits operatively associated with said electromagnetic switches, and a register registering the new check value $k_i$ and supplying the same to said switch unit before the next value $w_{i+1}$ is entered, comprising a plurality of relays each operatively associated with one of the said electromagnetic switches and each including a make contact, a holding contact and a plurality of contacts serving to indicate the position of the register, holding circuits operatively associated with the holding contacts, each of the said electromagnetic switches being energized through the make contact of the associated relay; and means for transmitting the check value of each number entered into said input unit to said calculating unit, including a switch member interrupting the holding circuits of the said relays and the energizing circuits of the said electromagnetic switches, and closing the holding circuits of the said electromagnetic switches during each transmission.

7. In combination, an input unit comprising means for computing from the digits of a number a check value depending on the remainder obtained on division of the number by a fixed key value, and for checking a number accompanied by such a check value; a calculating unit comprising means for computing from the check values of a plurality of numbers the check value of the result of an arithmetical operation applied to the said numbers; first transmitting means for transmitting to said calculating unit the check value of a number entered in said input unit as computed in the same; second transmitting means for transmitting to said calculating unit the check value of a number entered into said input unit together with an associated check symbol representing said check value; means controlled by said input unit for preventing the operation of said second transmitting means if a check made in said input unit shows said number or said associated check symbol to be wrong; and switching means for alternately making said first and said second transmitting means operative.

References Cited in the file of this patent

UNITED STATES PATENTS

| | | |
|---|---|---|
| 2,731,199 | Ghertman et al. | Jan. 17, 1956 |
| 2,805,824 | Knutsen | Sept. 10, 1957 |

OTHER REFERENCES

Faster, Faster, Eckert and Jones, McGraw-Hill Book Co., Inc., 1955, pages 98–104.